(12) United States Patent
Murphy et al.

(10) Patent No.: US 11,093,587 B2
(45) Date of Patent: *Aug. 17, 2021

(54) SOFTWARE WRAPPER AND INSTALLER USING TIMESTAMP VALIDATION AND SYSTEM IDENTIFICATION VALIDATION

(71) Applicant: Virtual Marketing Incorporated, Chicago, IL (US)

(72) Inventors: Matthew Steven Murphy, Chicago, IL (US); Jacob W. Beckley, Chicago, IL (US)

(73) Assignee: VIRTUAL MARKETING, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/588,164

(22) Filed: Sep. 30, 2019

(65) Prior Publication Data

US 2020/0026824 A1 Jan. 23, 2020

Related U.S. Application Data

(63) Continuation of application No. 15/857,085, filed on Dec. 28, 2017, now Pat. No. 10,430,564, which is a
(Continued)

(51) Int. Cl.
*H04L 9/32* (2006.01)
*G06F 21/12* (2013.01)
*G06F 8/61* (2018.01)

(52) U.S. Cl.
CPC ............... *G06F 21/12* (2013.01); *G06F 8/61* (2013.01); *H04L 9/3226* (2013.01); *H04L 9/3297* (2013.01); *G06F 2221/0704* (2013.01)

(58) Field of Classification Search
CPC .... G06F 21/12; G06F 8/61; G06F 2221/0704; H04L 9/3297; H04L 9/3226
See application file for complete search history.

(56) References Cited

U.S. PATENT DOCUMENTS

| | | | |
|---|---|---|---|
| 6,683,546 B1 * | 1/2004 | Torrubia-Saez | G06F 21/10 341/51 |
| 2003/0212639 A1 * | 11/2003 | Cronce | G06F 21/10 705/57 |

(Continued)

*Primary Examiner* — Khoi V Le
(74) *Attorney, Agent, or Firm* — K&L Gates LLP

(57) ABSTRACT

Systems, methods, and apparatuses for installing a software product using timestamp validation and system identification validation are disclosed. An example method to lock a software product in a software wrapper includes determining a unique hard drive serial number of a user device to which the software product is to be installed and generating a hash number of the unique hard drive serial number. The example method also includes determining a campaign identifier of the software product from a secure variable within the software product and generating a date-time code based on a current date and time. The method further includes assembling the date-time code and the campaign identifier into an unlock code, encrypting the unlock code using the hash number as a passphrase key to create an encrypted unlock code, and applying the encrypted unlock code to an end of a filename of an installer using a command line parameter.

20 Claims, 14 Drawing Sheets

Related U.S. Application Data continuation of application No. 14/692,220, filed on Apr. 21, 2015, now Pat. No. 9,940,444.

(60) Provisional application No. 61/982,116, filed on Apr. 21, 2014.

(56) References Cited

U.S. PATENT DOCUMENTS

| | | | |
|---|---|---|---|
| 2005/0060568 A1* | 3/2005 | Beresnevichiene | H04L 63/0823 726/26 |
| 2005/0114672 A1* | 5/2005 | Duncan | G06F 21/10 713/182 |
| 2006/0059561 A1* | 3/2006 | Ronning | G06F 21/10 726/26 |
| 2006/0224456 A1* | 10/2006 | Walker | G07F 17/323 705/14.1 |
| 2009/0319782 A1* | 12/2009 | Lee | G06F 21/575 713/156 |
| 2015/0242648 A1* | 8/2015 | Lemmey | G06F 21/6254 726/30 |

* cited by examiner

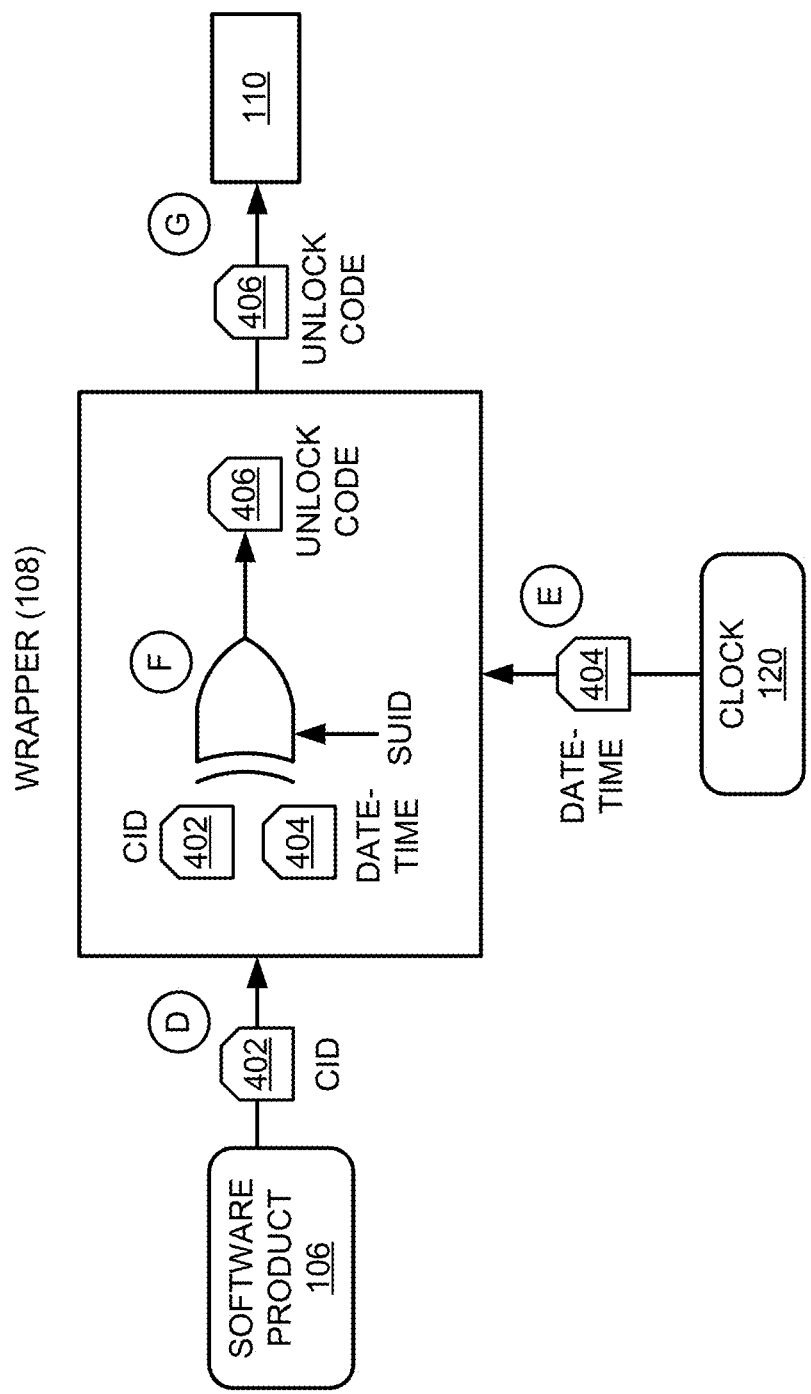

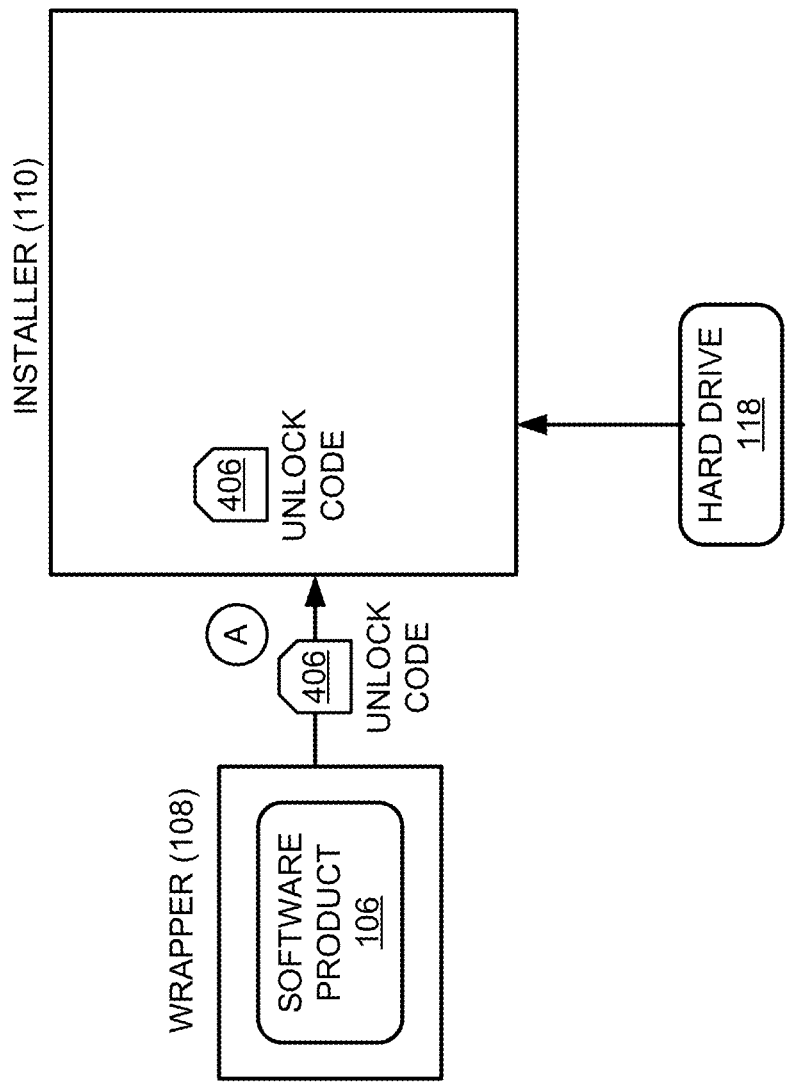

SOFTWARE WRAPPER AND INSTALLER USING TIMESTAMP VALIDATION AND SYSTEM IDENTIFICATION VALIDATION

PRIORITY CLAIM

The present application is a continuation of, claims priority to and the benefit of U.S. patent application Ser. No. 15/857,085, filed on Dec. 28, 2017, now U.S. Pat. No. 10,430,564, which is a continuation of U.S. patent application Ser. No. 14/692,220, filed on Apr. 21, 2015, now U.S. Pat. No. 9,940,444, which claims priority to and the benefit of U.S. Provisional Patent Application 61/982,116, filed Apr. 21, 2014, the entirety of which are incorporated herein by reference.

BACKGROUND

A major concern of software and digital content producers is the relative ease with which individuals may make illegal copies from their works. One only has to visit a black market website or certain neighborhoods (or countries) to find pirated digital content. To curtail electronic pirating, many software and digital content producers use Digital Rights Management ("DRM") software configured to prevent illegal copies of digital content from being produced. However, it seems each new DRM innovation is only a speed bump for people that illegally copy and distribute software and digital content. For example, encryption techniques are used to control access and reproduction of software and other digital content. These known encryption techniques may control a number of times software is allowed to be installed or may require that the software or digital content periodically authenticate with a server. Other known DRM techniques have a one-time use activation code.

Despite the most advanced DRM software, there are well documented instances of pirates finding countermeasures. Many pirates have found ways to break an encryption code to reset the number of allowed software downloads (or reset the one time use limit). Many of these pirates have also found ways to spoof an authentication server to enable the operation or playback of pirated content. Such illegal actions have been estimated to cost software and digital content producers billions of dollars a year in lost sales.

SUMMARY

The present disclosure provides new and innovative systems, methods, and apparatuses to securely install a software product using a software wrapper having timestamp validation and/or system identification validation. The example software wrapper is configured to solve some of the above issues of known DRM software by permitting a software product to be installed on only one specified user device within a specified time. The example software wrapper creates an encrypted unlock code based at least on user device information and software product information. The unlock code may only be used by an installer launched from the example software wrapper to ensure the software product is only installed once on a specified system within a specified time period.

In an example embodiment, a software wrapper apparatus includes an interface configured to receive a request for a software product including an identifier of a user device to receive the software product and payment completion information. The example software wrapper apparatus also includes a wrapper configuration processor configured to provision a software wrapper by generating a hash number of the identifier, determining a campaign identifier of the software product from a secure variable within the software product, and generating a date-time code in a predefined format based on a current date and time. The example wrapper configuration processor creates an unlock code by assembling the date-time code and the campaign identifier into the unlock code and encrypts the unlock code using the hash number as a passphrase key to create an encrypted unlock code. The example software wrapper apparatus further includes a wrapper application processor configured to apply the encrypted unlock code to an end of a filename of an installer of the software product using a command line parameter, encompass the software wrapper around the software product to prevent the software product from being accessible without the software wrapper, and transmit the installer and the software wrapper including the software product to the user device.

In another embodiment, a user device apparatus for configuring a software wrapper includes an interface configured to receive a software product encompassed within an un-configured software wrapper, an installer for the software product, and registration information for the software product. The user device apparatus also includes a hard drive (e.g., a solid state device, a persistent storage device, a flash storage device, etc.) including a unique hard drive serial number, a clock configured to maintain a month, day, year, and time, and a processor configured execute at least one instruction of the software wrapper to configure the software wrapper. The at least one instruction causes the processor to determine the unique hard drive serial number from the hard drive, generate a hash number of the unique hard drive serial number, determine a campaign identifier of the software product from a secure variable within the software product, and generate a date-time code in a predefined format based on a current date and time of the clock. The processor may also assemble the date-time code and the campaign identifier into an unlock code, encrypt the unlock code using the hash number as a passphrase key to create an encrypted unlock code, and apply the encrypted unlock code to an end of a filename of the installer using a command line parameter.

In yet another embodiment, a method to lock a software product in a software wrapper includes determining, via a processor, a unique hard drive serial number from a primary hard drive of a user device to which the software product is to be installed, generating, via the processor, a hash number of the unique hard drive serial number, and determining, via the processor, a campaign identifier of the software product from a secure variable within the software product. The example method also includes generating, via the processor, a date-time code in a predefined format based on a current date and time and assembling, via the processor, the date-time code and the campaign identifier into an unlock code. The example method further includes encrypting, via the processor, the unlock code using the hash number as a passphrase key to create an encrypted unlock code and applying, via the processor, the encrypted unlock code to an end of a filename of an installer using a command line parameter.

In a further embodiment, a method to install a software product locked in a software wrapper includes launching, via a processor, an installer associated with the software product, the installer being launched from the software wrapper and determining, via the processor, an encrypted unlock code within a command line parameter of the installer, the encrypted unlock code being provided by the software wrapper. The example method also incudes generating, via the processor, a hash number of the unique hard drive serial number and decrypting, via the processor, the encrypted unlock code using the hash number as a passphrase key. The example method moreover includes disassembling, via the processor, the decrypted unlock code to determine a first date-time code and a first campaign identifier and generating, via the processor, a second date-time code in a predefined format based on a current date and time. The example method further includes determining a time difference between the second date-time code and the first date-time code and determining, via the processor, a second campaign identifier of the software product from a secure variable within the software product. Conditioned on i) the first campaign identifier matching the second campaign identifier and ii) the time difference being less than a predefined threshold, the example method uses the installer, via the processor, to install the software product.

Additional features and advantages of the disclosed system, method, and apparatus are described in, and will be apparent from, the following Detailed Description and the Figures.

BRIEF DESCRIPTION OF THE FIGURES

FIGS. 3 and 4 show diagrams illustrating how the example wrapper of FIGS. 1 and 2 uses timestamp and system validation to prepare a software product for a one-time installation, according to an example embodiment of the present disclosure.

FIGS. 5A to 5C and 6A to 6C show diagrams illustrating how the example installer of FIGS. 1 and 2 uses timestamp and system validation to prepare a software product for a one-time installation, according to an example embodiment of the present disclosure.

DETAILED DESCRIPTION

The present disclosure relates in general to a method, apparatus, and system that use timestamp validation and system identification validation to reduce or eliminate the chance of software or other digital media being pirated or otherwise illegally copied. The disclosed method, apparatus and system use a software wrapper that operates in conjunction with an installer to allow a software product or other digital content to be installed only once on a specified system at a specified time. Otherwise, the example software wrapper and/or the installer will prevent the installation of the software product or execution of the digital content.

A benefit of the method, system, and apparatus disclosed herein is that the example installer verifies that it was launched from a specified wrapper in conjunction with determining that the installation is to occur on the same system that made the purchase (or specified during the purchase). Further, the installer verifies that the installation is to occur within a specified time period, such as the time between when the wrapper and/or the installer were launched and when the installation process began. The combination of these verification procedures prevents an individual from illegally sharing the installation of a software product with another user device. The verification also prevents an individual from installing a software product at a later time outside of a controlled environment.

Reference is made throughout to a software product to be installed on a user device. The software product may include software configured to operate on a computer, laptop, smartphone, tablet computer, server, smart-eyewear, smartwatch, etc. The software product may include game software, document processing software, accounting software, picture/video editing software, etc. It should be appreciated that the type of software product is virtually limitless.

Further, while the disclosure discusses the installation of a software product (e.g., a computer-executable application), it should be appreciated that the example wrapper and installer may be used to control the playing or execution of digital content (e.g., digital media, digital files, etc.). For example, the wrapper may be used to ensure that the digital content is played only on a specified device at one or more specified times. The digital content may include video games, movies, music, television shows, etc.

Figure 1:
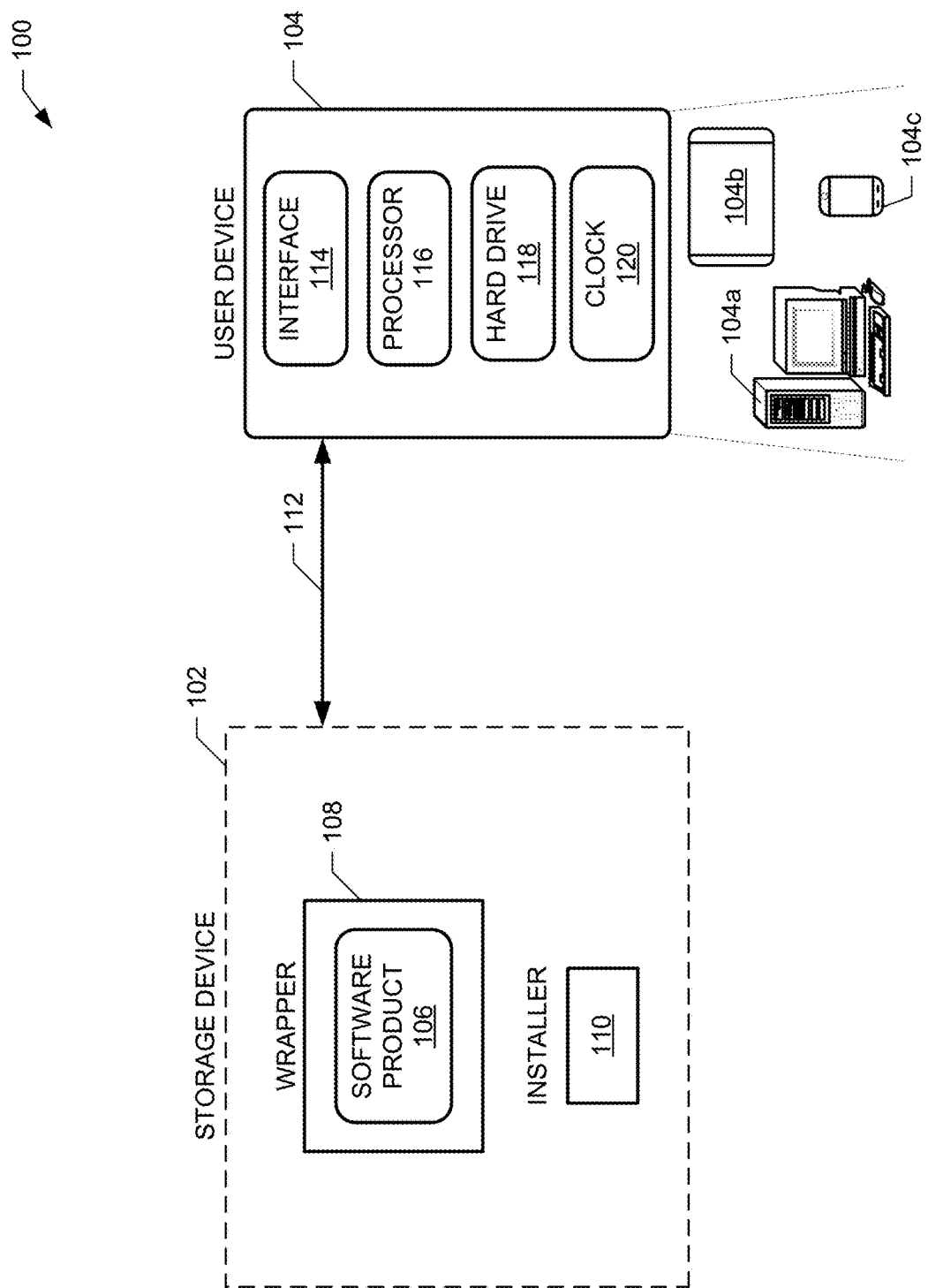
FIG. 1 shows an installation environment that includes a user device and a storage device having a wrapper and an installer, according to an example embodiment of the present disclosure.

FIG. 1 shows an installation environment 100 that includes a storage device 102 and a user device 104, according to an example embodiment of the present disclosure. The storage device 102 is configured to store a software product 106 for installation at the user device 104. The storage device 102 may include, for example, a compact disk ("CD"), a universal serial bus ("USB") mass storage device (e.g., a flash drive), a flash memory stick (e.g., a secure digital ("SD") card), a near field communication ("NFC") memory card, or any other storage device that enables files to be stored and transferred wirelessly or via a wire or connector to another device.

The example storage device 102 includes a software product 106 to be installed at the user device 104. The software product 106 includes files that provide instructions for decompressing and installing the software product 106 on the user device 104. The software product 106 also includes content (e.g., image files, video files, interface files, command files, etc.) to support the operation of the software product 106 on the user device 104. As discussed, the software product 106 may include any type of software program.

The example storage device 102 also includes a wrapper 108 configured to securitize the installation of the software product 106. The example wrapper 108 includes machine executable code that encompasses or otherwise accompanies the software product 106. The wrapper 108 is configured to provide a layer of enhanced security so that the software product 106 may only be installed on the user device 104 at a specified time by using an encryption algorithm that encrypts campaign specific information and temporal parameters to create an activation code (or unlock code) with a passphrase key that corresponds to a unique hardware identifier. The wrapper 108 may also compress and encrypt the software product 106 that is to be installed. The wrapper 108 may be developed using, for example, Applicability Statement 3 ("AS3").

An example installer 110 includes a file having computer-executable instructions that specify how the software product 106 is to be installed on the user device 104. The installer 110 may include, for example, InstallShield. As discussed in more detail below, the example installer 110 is configured to be operable only if it is launched from the wrapper 108.

The example storage device 102 of FIG. 1 is communicatively coupled to the user device 104 via a communication medium 112. The communication medium 112 may include, for example, a USB cable, an NFC medium, etc. The device 104 includes a hardware interface (e.g., a USB slot or SD slot) in embodiments where the storage device 102 is insertable into the user device 104.

The example user device 104 includes any device that may install and operate software. FIG. 1 shows that the user device 104 may include a desktop computer 104a, a tablet computer 104b, or a smartphone 104c. The user device 104 may also include, for example, a server, a laptop, a workstation, smart-eyewear, a smartwatch, etc. The user device 104 comprises an interface 114 for receiving or otherwise communicating with the storage device 102. The interface 114 may include a hardware component for physically receiving the storage device 102. The interface 114 may also include connectors or for connecting to electrical connectors of the storage device 102. The interface 114 may further include drivers to enable the user device 104 to communicate with the storage device 102 or otherwise read data from the storage device 102.

The example user device 104 also includes a processor 116 (e.g., a computer processor) configured to read or otherwise access the wrapper 108 and the installer 110 to perform an installation routine for the software product 106. The example processor 116 is also configured to store the installed software product 106 to a memory, such as a hard drive 118. It should be appreciated that the processor 116 may also perform other functions and/or processes associated with computers, smartphones, tablet computers, servers, etc. including, for example, executing and operating the installed software product 106. The example user device 104 also includes a system clock 120 to maintain a month, day, year, and time.

Figure 2:
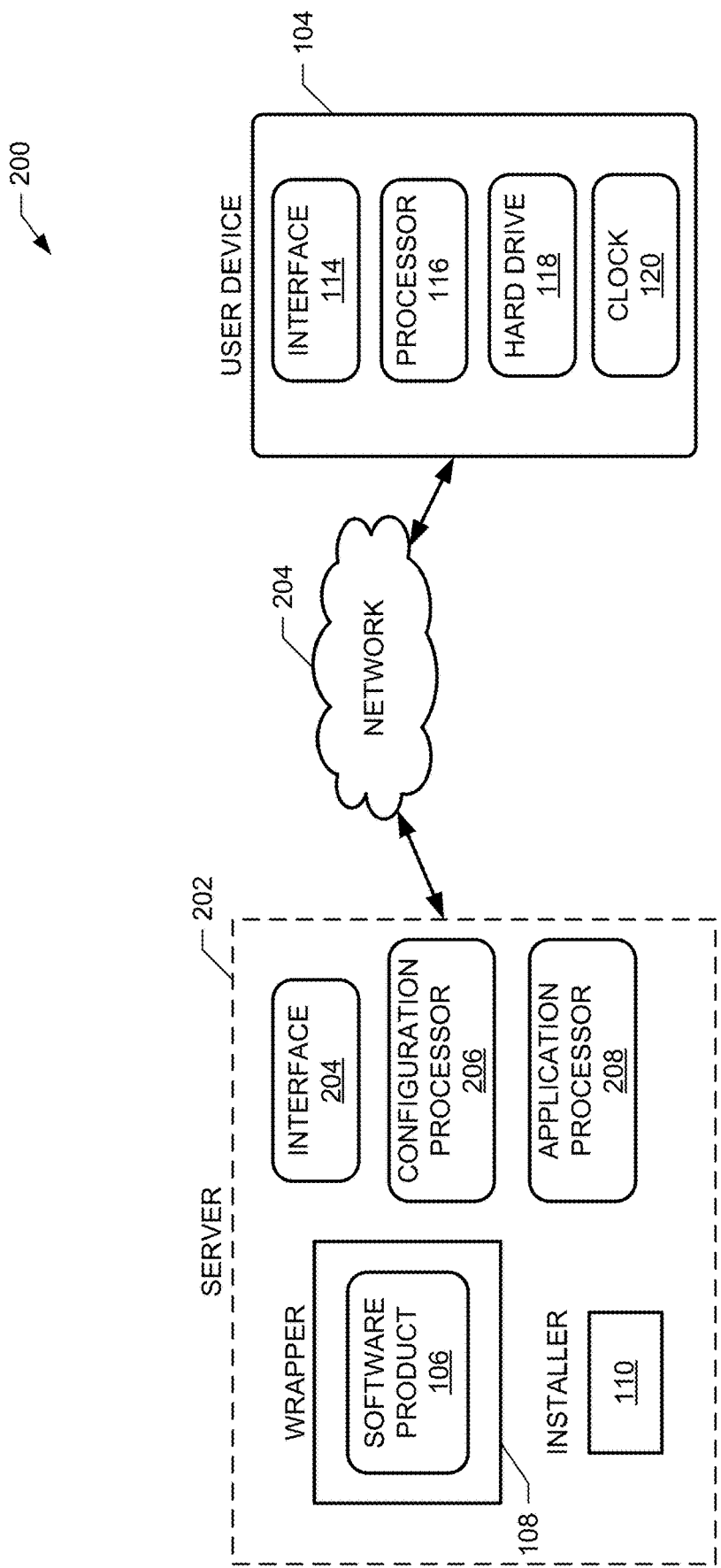
FIG. 2 shows an alternative installation environment where a server may provide a software product, a wrapper, and/or an installer, according to an example embodiment of the present disclosure.

FIG. 2 shows an alternative installation environment 200 where a server 202 may provide the software product 106, the wrapper 108, and/or the installer 110. The example server 202 may be provided by a third-party creator of the software product 106, a third-party reseller, and/or a third-party payment processor. For example, the server 202 may host a website that enables users to select software to purchase and download. For each instance of the software product 106 to be installed on a user device, the server 202 provisions a wrapper and an installer for the software product 106. The server 202 operates in conjunction with the user device 104 to install the software product 106 using the wrapper 108 and the installer 110. In this embodiment, the server 202 is communicatively coupled to the user device 104 via a network 204 (e.g., the Internet) such that the installation occurs through an Internet connection (and corresponding web interfaces) of the user device 104.

In an embodiment, the example server 202 is configured to configure the wrapper 108 before the wrapper 108 and the software product 106 are transmitted to the user device 104. The server 202 includes an interface 204 configured to receive a request for a software product from the user device 104 (or another user device specifying the user device 104 as the intended recipient of the software product 106). The request may include registration information including an identifier of a user device 104 to receive the software product. The request may also include payment completion information. In some instances, the payment completion information may be provided by an online credit card payment gateway (e.g., CyberSource®) and/or a third-party associated with the software product 106. The registration and transmission of the payment completion information are discussed in more detail in conjunction with FIG. 10.

The example server 202 also includes a wrapper configuration processor 206 configured to provision a software wrapper for the user device 104. The wrapper configuration processor 206 uses at least some of the registration information and/or payment completion information to configure the wrapper 106. The example wrapper configuration processor 206 is configured to provision the wrapper 108 by generating a hash number of an identifier (e.g., a unique hard drive serial number) of the user device 104. The wrapper configuration processor 206 also determines a campaign identifier of the software product 106 from a secure variable within the software product and generates a date-time code in a predefined format based on a current date and time. In this example embodiment, the wrapper configuration processor 206 writes the campaign identifier to the secure variable after registration of the software product 106. The example wrapper configuration processor 206 is also configured to create an unlock code by assembling the date-time code and the campaign identifier into the unlock code and encrypt the unlock code using the hash number as a passphrase key to create an encrypted unlock code.

The example server 202 includes a wrapper application processor 208 configured to apply the encrypted unlock code to an end of a filename of the installer 110 of the software product 106 using a command line parameter. The wrapper application processor 208 prepares the software product for transmission to the user device 104 by encompassing the wrapper 108 around the software product 106 such that the software product 106 may not be accessed, launched, and/or executed without first launching the wrapper 108, which launches the installer 110 to install the software product 106. Such a configuration prevents the software product 106 from being accessible without the software wrapper 108 and/or the installer 110. After the wrapper 108 is configured and secured to the software product 106, the wrapper application processor 208 is configured to transmit the installer 110 and the wrapper 108 including the software product 106 to the user device 104 for installation.

In another embodiment, the example wrapper 108 may not be configured until after transmission to the user device 104. For example, the server 108 may not have an identifier of the user device 104 or registration information needed to fully provision the wrapper 108. In this embodiment, the example user device 104 receives (via the user interface 114) from the server 202 (either electronically via the network 204 or physically via a storage device 102) the software product 106 encompassed within the un-configured software wrapper 108 and the installer 110. The example interface 114 may also receive registration information for the software product 106 from an online credit card payment gateway and/or a third-party associated with the software product. The user interface 114 may also include a keypad to enable a user of the device 104 to manually enter the registration information. The user interface 114 may further include a web interface that stores the registration information locally to the user device 104 after a user registers with the server 202 for the software product 106.

As discussed above in conjunction with FIG. 1, the user device 104 includes the hard drive 118 having a unique hard drive serial number and the clock 120 configured to maintain a month, day, year, and time. The example processor 116 of the user device 104 is configured to execute at least one computer-readable instruction of the un-configured wrapper 108 causing the processor 116 to configure the wrapper 108. The at least one instruction causes the processor 116 of the user device 104 to determine the unique hard drive serial number from the hard drive 118 and generate a hash number of the unique hard drive serial number. The at least one instruction also causes the processor 116 to determine a campaign identifier of the software product 106 from a secure variable within the software product and generate a date-time code in a predefined format based on a current date and time of the clock 120. In this embodiment, the server 202 writes the campaign identifier to a secure variable before the software product 106 is transmitted to the user device 104.

The example processor 116 is caused by the at least one instruction of the wrapper 108 to assemble the date-time code and the campaign identifier into an unlock code and encrypt the unlock code using the hash number as a passphrase key to create an encrypted unlock code. The example processor 116 may also apply the encrypted unlock code to an end of a filename of the installer 110 using a command line parameter. At this point, the example wrapper 108 is configured and available to be launched to install the software product 106 on the user device 104. It should be appreciated that the software product 106 may not be accessible or capable of being installed to operate as intended until the wrapper 108 is configured. Such a configuration of the wrapper 108 and the software product 106 is designed to frustrate digital pirates and limit (or prevent) illegal copying.

Wrapper Embodiment

Figure 3:
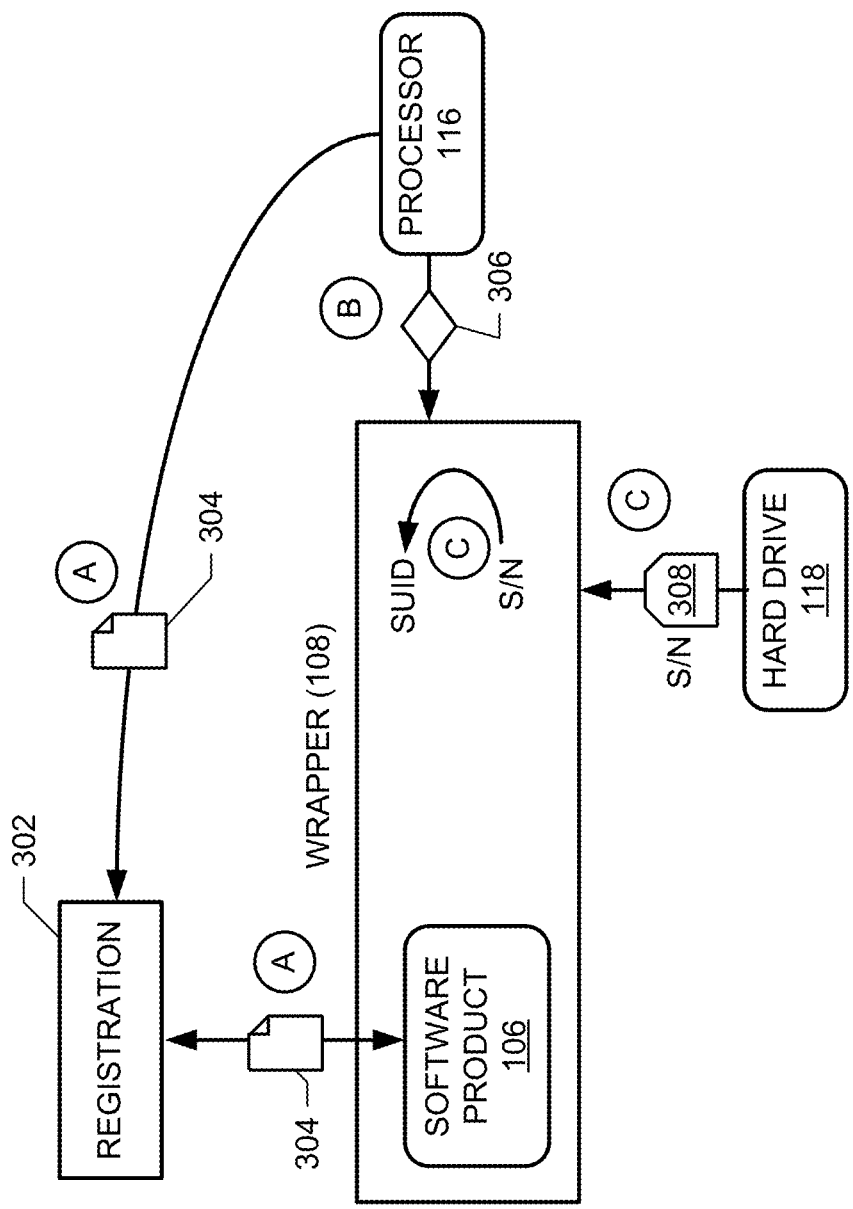

FIGS. 3 and 4 show diagrams illustrating how the example wrapper 108 uses timestamp and system validation to prepare the software product 106 for a one-time installation, according to an example embodiment of the present disclosure. It should be noted that the order of procedures or events discussed in conjunction with FIGS. 3 and 4 may be combined, rearranged, or reordered. Further, the procedures or events discussed in conjunction with FIGS. 3 and 4 may be carried out via, for example, the processor 116 of the user device 104 executing instructions of the wrapper 108 and/or by the server 202.

Initially at Event A, to install the software product 106, a user of the user device 104 purchases and/or registers 302 the software product 106. The registration 302 can include, for example, a user (via the processor 116 of the user device 104) providing registration information 304 such as a name, an address, a company name, billing information, an identifier of the user device 104, an identifier of a hardware component of the user device 104, campaign information, an estimated installation time, etc. The registration 302 may occur at the storage device 102 in instances where a user does not have access (or desire to have) an Internet connection. For example, the wrapper 108 may be configured to require the user to provide the registration information 304 prior to beginning an installation process of the software product 106. Alternatively, a user may register online via the server 202.

During the registration process of Event A, some of the registration information 304 may be written or otherwise included within the yet to be installed software product 106. This information could include an identifier of a user. In some embodiments, the server 202 may create or provision the software product 106 for installation using, in part, some of the registration information 304. An example registration embodiment is discussed in conjunction with FIG. 10.

After registering, the wrapper 108 enables a user to begin the installation process by, for example, selecting a button displayed by the user device 104, as shown in Event B. Selecting this button causes the processor 116 to send a message 306 indicative of the user's desire to begin the installation of the software product 106 on the user device 104. The wrapper 108 may not begin the process of generating a one-time use unique unlock code until the message 306 is received.

The example wrapper 108 at Event C determines or otherwise captures a unique serial number ("S/N") 308 from a component of the user device 104 (and/or a media access control ("MAC") address of the user device 104). In this embodiment, the wrapper 108 obtains a serial number of the primary hard drive 118 of the user device 104. At Event D, the example wrapper 108 creates a hash number based on the serial number 308. In some embodiments, the MD5 message-digest algorithm may be used to create the hash number from the serial number 308. The hash number may be a Set User ID upon execution ("SUID") number. The example wrapper 108 uses the SUID number as a passphrase key to encrypt an unlock code. It should be appreciated that the SUID number is unique and can never be replicated from one machine to another machine. Further the SUID number cannot be identical to another machine.

After creating the SUID, the example wrapper 108 at Event D in FIG. 4 is configured to determine a campaign identifier ("CID") 402 from a secure variable in the software product 106. The CID 402 may include a human readable string identifying a campaign, company, software type, software name, user name, etc. associated with the software product 106 to be installed on the user device 104. As discussed above, the CID 402 may be written to the secure variable during the registration 302 or prior when the software product 106 is specifically provisioned or otherwise created for the user. It should be appreciated that the secure variable within the software product 106 cannot be deciphered through any decryption or otherwise malicious attempt to exploit.

At Event E, the example wrapper 108 determines date and time information ("date-time") 404 of the user device 104 via the clock 120. The example wrapper 108 also formats the date-time information 404 into a predefined format (e.g., YYYY:MM:DD HH:MM:SS). At Event F the example wrapper 108 combines or otherwise assembles the CID 402 and the formatted date-time information 404 into an activation code or unlock code. The combination may include placing the CID 402 first followed by the formatted date-time information 404. At Event F, the example wrapper 108 also encrypts the activation code or unlock code using, for example, XOR encryption. The example wrapper 108 uses the SUID as the passphrase key to create an encrypted unlock code 406 (or encrypted activation code). The example wrapper 108 adds the encrypted unlock code 406 to a filename of the installer 110 using, for example, a command line parameter. The encrypted unlock code 406 may be added to an end of the filename of the installer 110. At Event G, the wrapper 108 invokes or otherwise causes the installer 110 to launch using, in part, the encrypted unlock code 406 within the command line parameter. In some embodiments, the example wrapper 108 waits to launch the installer 110 until a command or request message is received.

Installer Embodiment

FIGS. 5A to 5C and 6A to 6C show diagrams illustrating how the example installer 110 uses timestamp and system validation to prepare the software product 106 for a one-time installation, according to an example embodiment of the present disclosure. It should be noted that the order of procedures or events discussed in conjunction with FIGS. 5A to 5C and 6A to 6C may be combined, rearranged, or reordered. Further, the procedures or events discussed in conjunction with FIGS. 5A to 5C and 6A to 6C may be carried out via, for example, the processor 116 of the user device 104 executing instructions of the installer 110 and/or by the server 202.

At Event A of FIG. 5A, the example installer 110 launches using, in part, the encrypted unlock code 406 within the command line parameter provided by the wrapper 108. The installer 110 may be configured to search for the encrypted unlock code upon launch. Conditioned upon not detecting the encrypted unlock code 406, the example installer 110 may be configured to exit, shutdown, or otherwise become inoperable. The example installer 110 may also provide a warning message to be displayed by the user device 104 that that installer 110 must be launched from the wrapper 108.

Figure 5B:
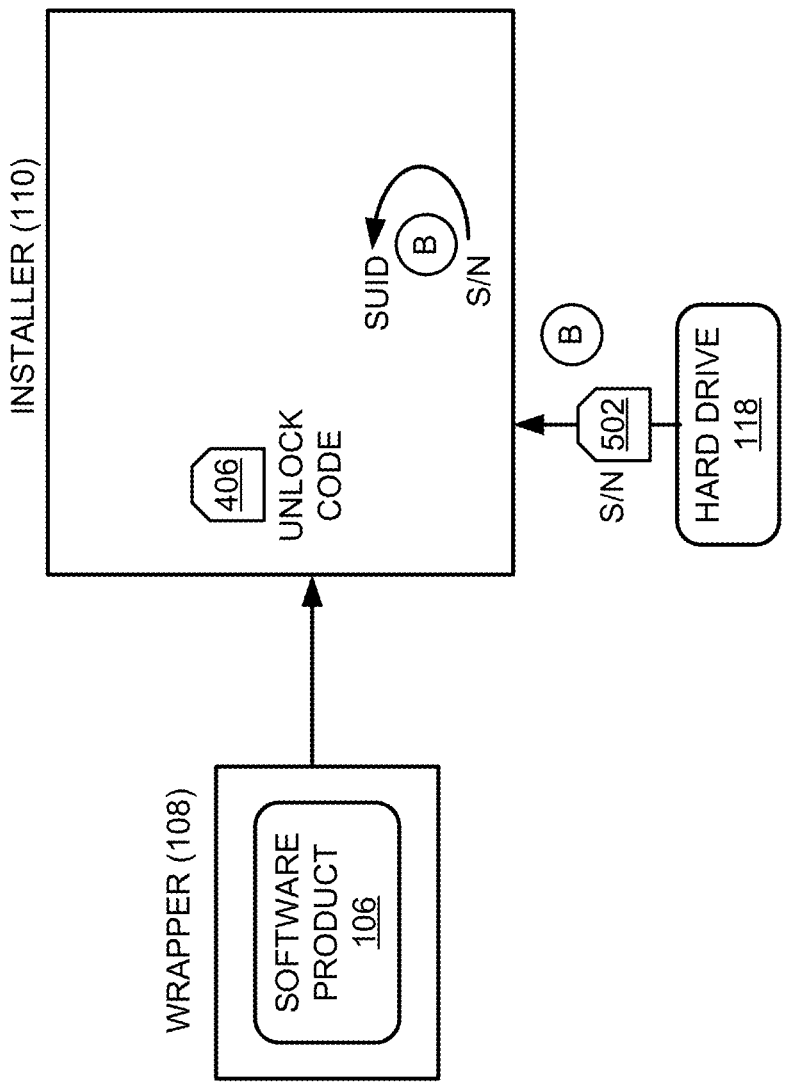

In Event B shown in FIG. 5B, after determining that encrypted unlock code 406 in the command line parameters has been verified, the installer 110 accesses or otherwise reads a serial number 502 from the hard drive 118. Also at Event B, the installer 110 uses, for example, the MD5 message-digest algorithm to create an MD5 hash number of the serial number 502 (e.g., the SUID).

Figure 5C:
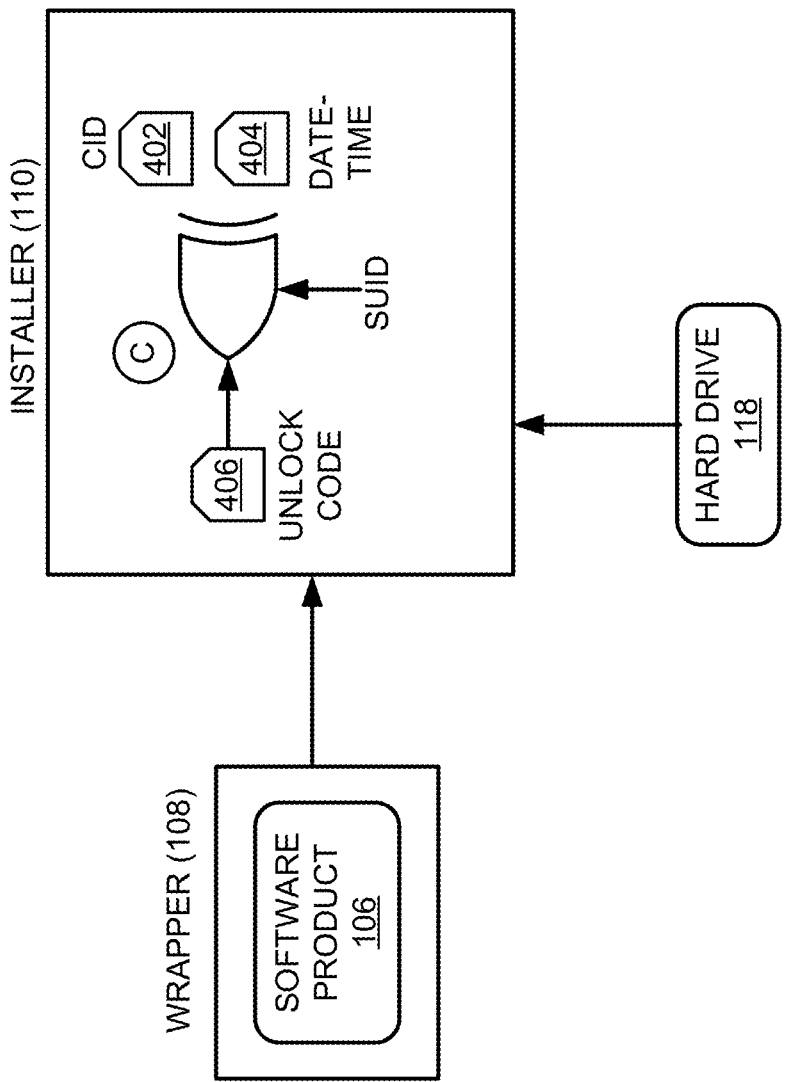

At Event C shown in FIG. 5C, the example installer 110 decrypts the encrypted unlock code 406 using the newly generated SUID as the passphrase. It should be appreciated that the wrapper 108 does not share its SUID with the installer 110. The decryption of the encrypted unlock code 406 generates the unlock code including the combined CID 402 and the date-time information 404.

The installer 110 may be configured to transmit a notification message to a user of the user device 104 indicating that an error occurred during decryption and that the installation processed needs to be restarted. The example installer 110 may also determine that the CID 402 and the date-time information 404 are in a specified format and within a range of acceptable values. The installer 110 may transmit an error message conditioned upon the CID 402 and/or the date-time information 404 not being of the specified format and/or within the range of acceptable values.

Figure 6A:
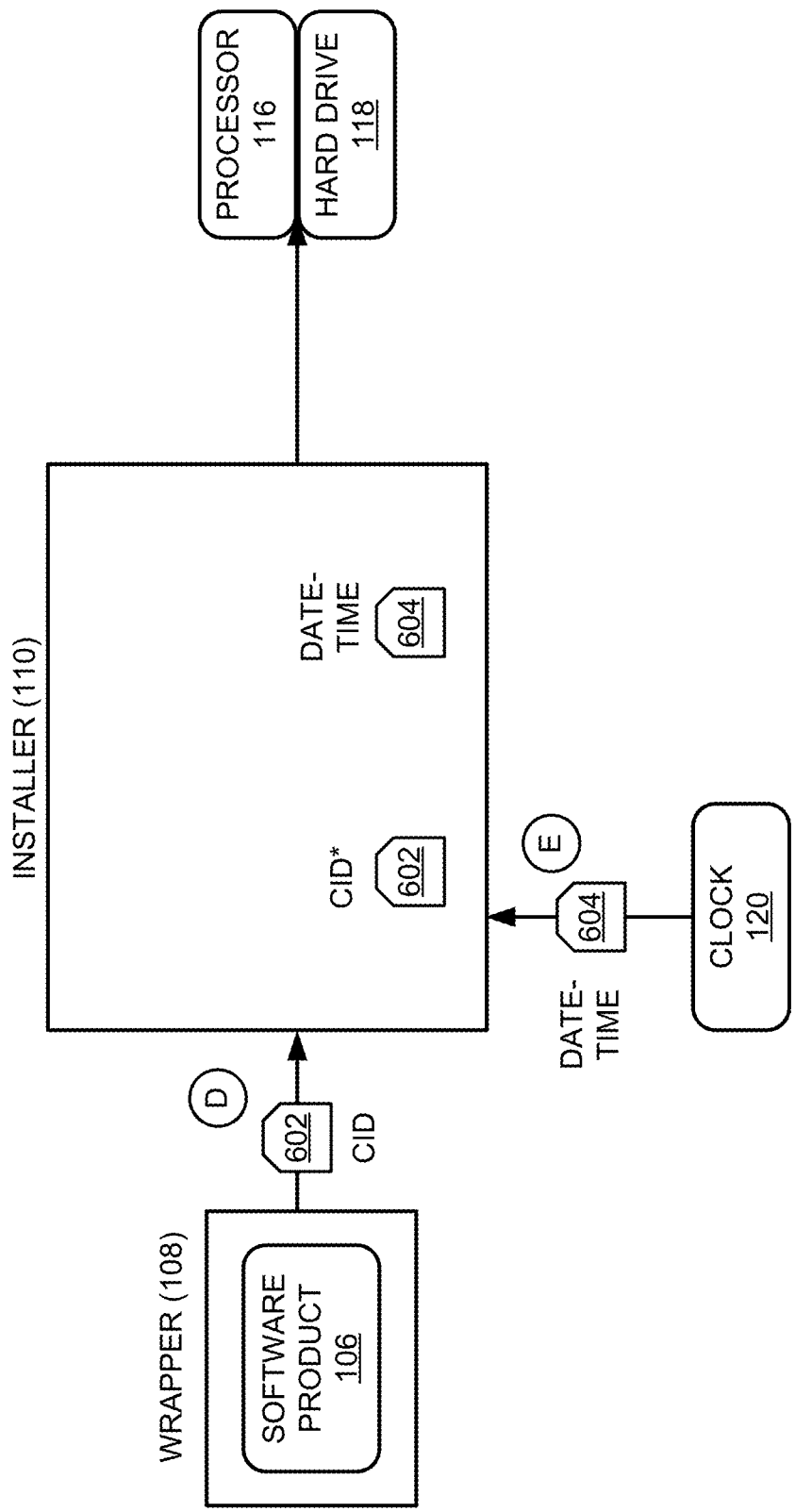

At Event D shown in FIG. 6A, the example installer 110 reads or otherwise accesses a CID 602 from the secure variable of the software product 106. Alternatively, the installer 110 may determine the CID 602 from an expected value or name based on the parameters of the installation. For instance, the wrapper 108 may inform the installer 110 of a campaign name, user name, company name, etc. associated with the installation, which the installer 110 uses for the CID 602.

At Event E also shown in FIG. 6A, the example installer 110 is configured to access the clock 120 to determine a date and time ("date-time") 604 of the user device 104. The example installer 110 also formats the date-time information 604 into a predefined format (e.g., YYYY:MM:DD HH:MM:SS).

Figure 6B:
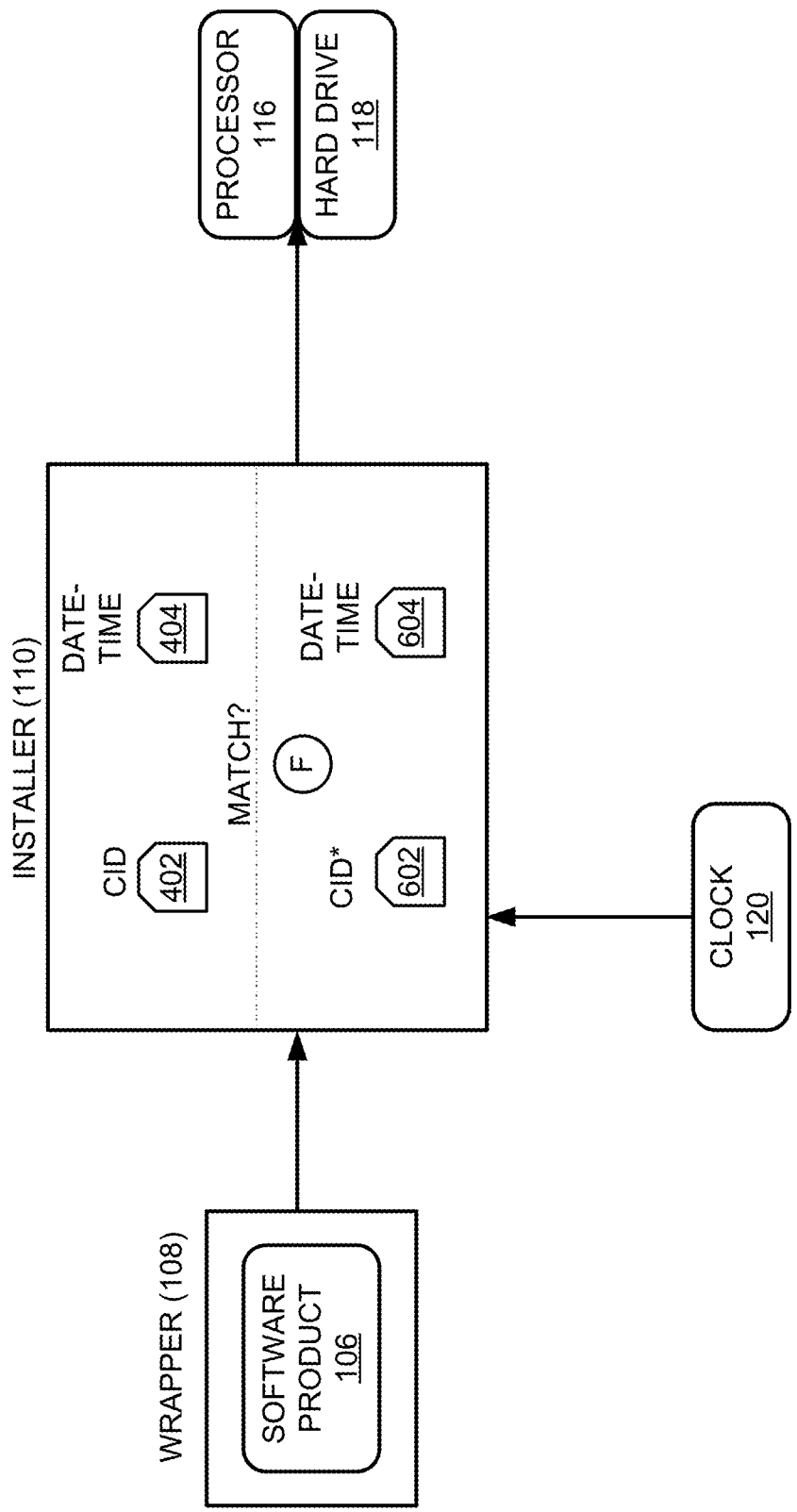

At Event F shown in FIG. 6B, the example installer 110 is configured to compare the CID 402 to the CID 602 and the date-time information 404 to the date-time information 604. The comparison of the CIDs 402 and 602 confirms whether the software product 106 is being installed for the same campaign, organization, user, for which it was purchased and/or registered. The comparison of the date-time information 404 and 604 ensures that the software product 106 is to be installed within a specified time period (as may have been specified during the registration 302). In some embodiments, the installer 110 may determine a difference between the date-time information 604 and the date-time information 404 and compare this difference to a specified threshold (e.g., 2 seconds, 10 seconds, 60 seconds, 10 minutes, 30 minutes, 60 minutes, etc.). Preferably, the specified threshold is less than 10 minutes. Such a comparison ensures that the software product 106 is installed relatively quickly and does not allow a user enough time to implement countermeasures to the encryption or make illegal copies. Conditioned on a match not occurring in Event F, the installer 110 may transmit an error message. In some instances, the installer 110 may cause the software product 106 to become deleted or otherwise inaccessible if an error occurs during installation indicative that a user is attempting to circumvent the security protections of the wrapper 108 and/or the installer 110.

Figure 6C:
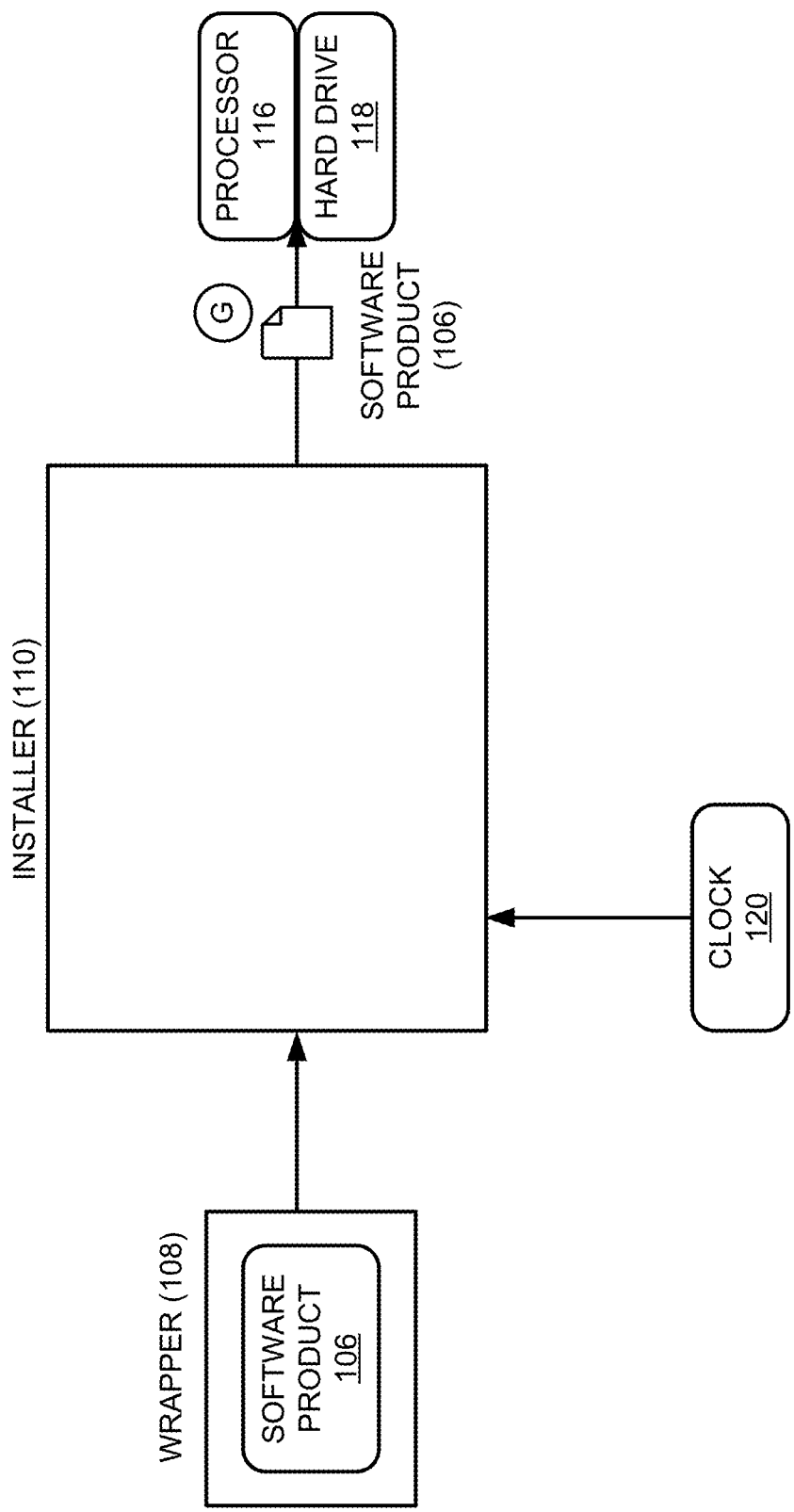

At Event G shown in FIG. 6C, conditioned on a match occurring at Event F, the installer 110 begins the installation of the software product onto the user device 104 including storing an operating version of the software product 106 to the hard drive 118. The installer 110 may then deactivate or become inactive. In some instances, the installer 110 may also delete the wrapper 108 before becoming inactive. At this point, the processor 116 may operate the software product 106 as intended.

Flowchart of the Example Process

Figure 7:
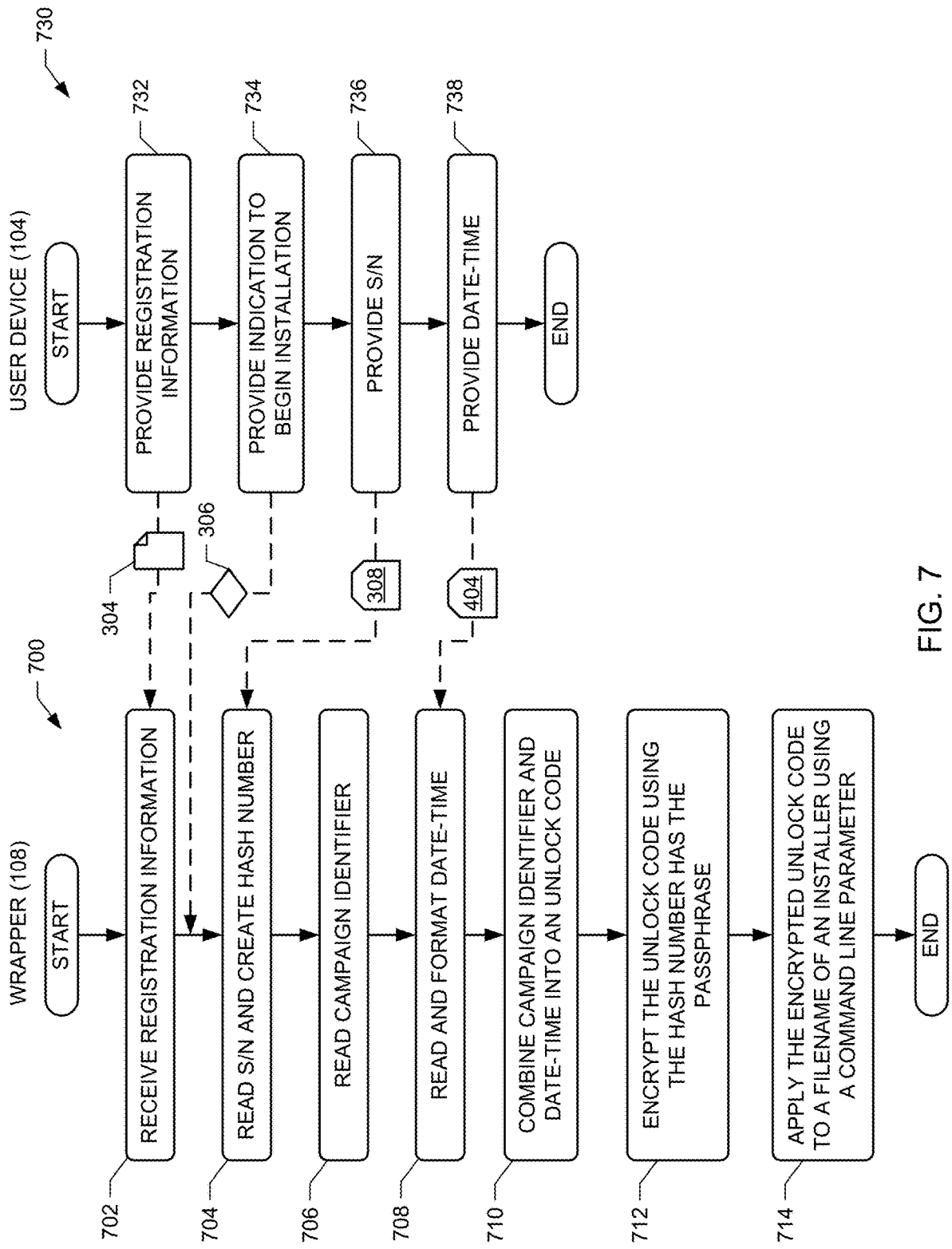
FIG. 7 shows diagrams of example procedures to create an encrypted unlock code, according to an example embodiment of the present disclosure.

FIG. 7 illustrates flow diagrams showing example procedures 700 and 730 to create the encrypted unlock code 406 of FIGS. 3 and 4, according to an example embodiment of the present disclosure. Although the procedures 700 and 730 are described with reference to the flow diagrams illustrated in FIG. 7, it should be appreciated that many other methods of performing the steps or events associated with the procedures 700 and 730 may be used. For example, the order of many of the blocks may be changed, certain blocks may be combined with other blocks, and many of the blocks described are optional. Further, the actions described in procedures 700 and 730 may be performed among multiple devices including, for example the wrapper 108, the user device 104, the server 202, and/or the wrapper 108 being executed by the processor 116 of the user device 104.

The procedure 700 begins when the wrapper 108 of FIGS. 1 to 4 receives the registration information 304 (block 702). Additionally or alternatively, the wrapper 108 may receive the message 306 indicating that a user has registered that desires to fulfill installation of the software product 106. The wrapper 108 next reads or otherwise obtains the serial number 308 from, for example, the hard drive 118 of the user device 104 which will receive the software product 106 and creates a hash number based on the serial number 308 (block 704). The wrapper 108 also obtains the campaign identifier 402 from the software product 106 to be installed (block 706).

The example procedure 700 continues by the wrapper 108 reading or otherwise obtaining date-time information 404 from, for example, the clock 120 of the user device 104 which will receive the software product 106 (block 708). The wrapper 108 formats the date-time information 404 to a predetermined format. The wrapper 108 also combines the date-time information 404 with the campaign identifier 402 to create an unlock code (block 710). The wrapper 108 encrypts the unlock code using the hash number as the passphrase to create the encrypted unlock code 406 (block 712). The wrapper 108 then applies the encrypted unlock code 406 to a filename of an installer using a command line parameter (block 714). The example procedure 700 of FIG. 7 then terminates or returns to preparing another encrypted unlock code for another software product.

The example procedure 730 begins when the user device 104 registers for the software product 106 by providing, for example the registration information 304 (block 732). The user device 104 may also provide the message 306 (responsive to an input from a user) to indicate the user desires to install the software product 106 (block 734). The user device 104 may receive a request from the wrapper 108 for a serial number of the hard drive 118. Responsive to this request, the user device 104 provides the serial number 308 to the wrapper 108 (block 736). The user device 104 may also receive a request from the wrapper 108 for a current date and time (e.g., a timestamp). Responsive to this request, the user device 104 polls the clock 120 and provides the date-time information 404 to the wrapper 108 (block 738). The example procedure 730 of FIG. 7 then terminates or returns to providing information for another software product.

Figure 8:
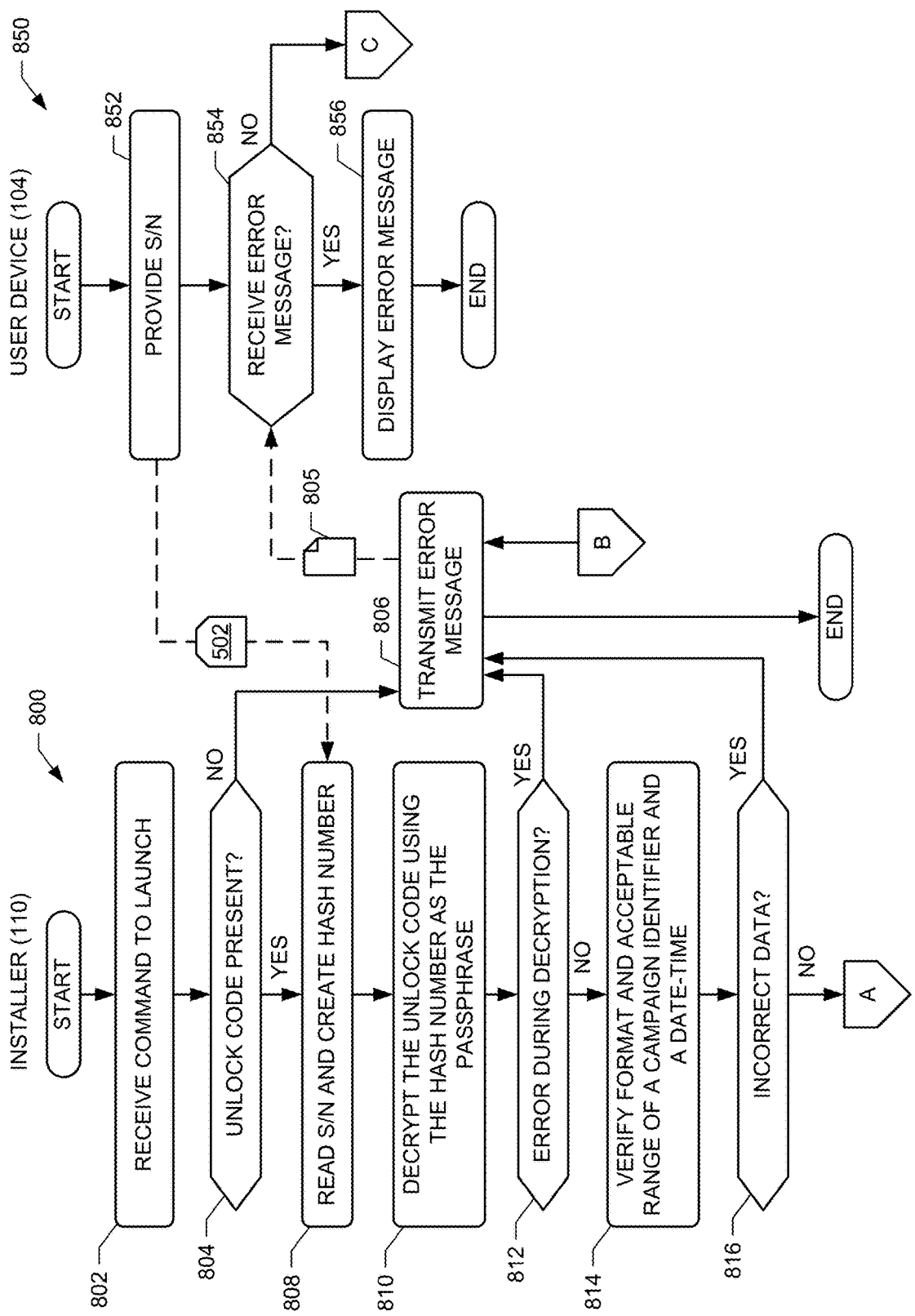
FIGS. 8 and 9 show diagrams of example procedures to decrypt an unlock code and install a software product, according to an example embodiment of the present disclosure.
Figure 9:
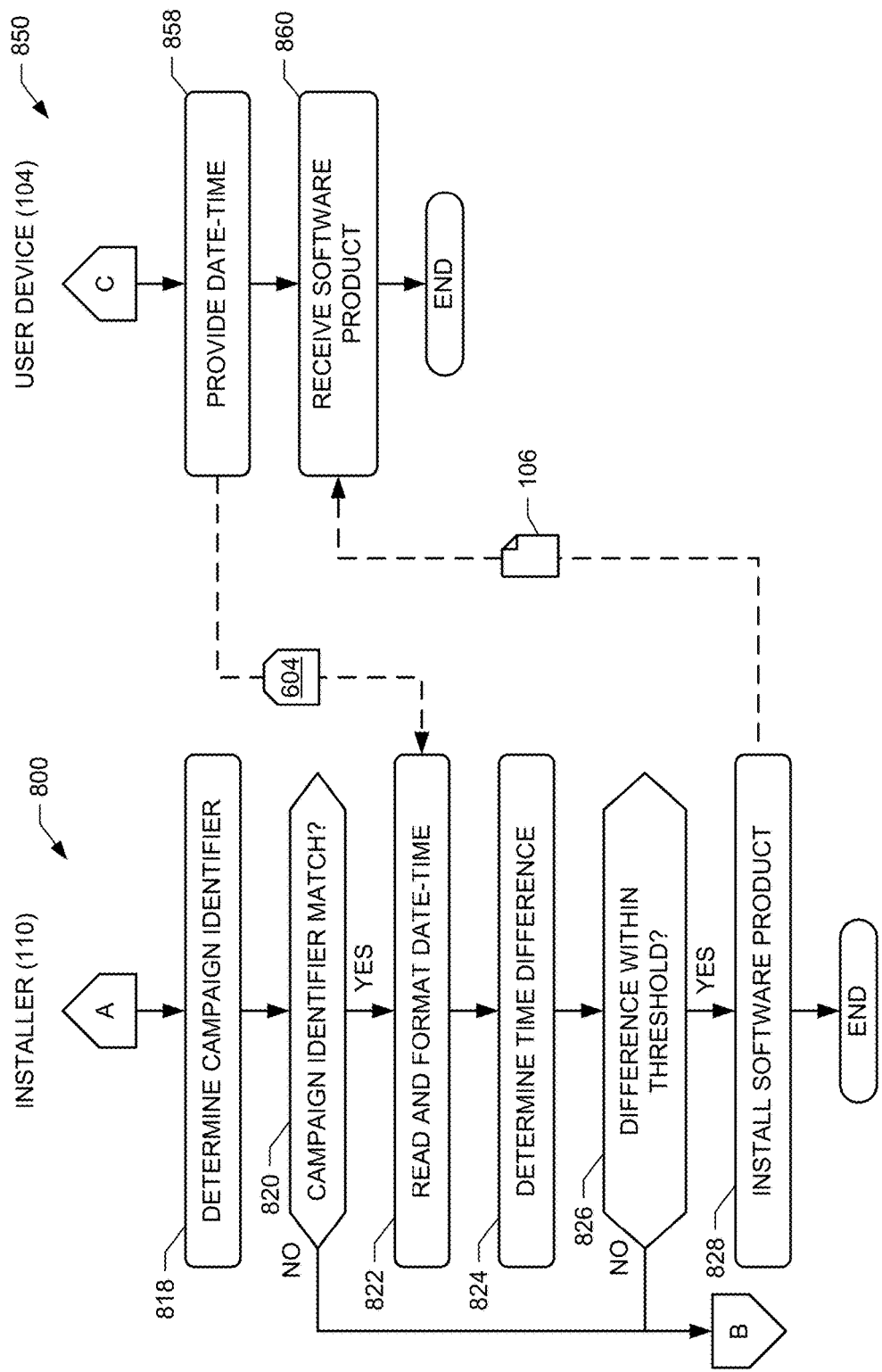

FIGS. 8 and 9 illustrate flow diagrams showing example procedures 800 and 850 to decrypt the encrypted unlock code 406 and install the software product 106, as discussed in conjunction with FIGS. 5A to 5C and 6A to 6C, according to an example embodiment of the present disclosure. Although the procedures 800 and 850 are described with reference to the flow diagrams illustrated in FIGS. 8 and 9, it should be appreciated that many other methods of performing the steps associated with the procedures 800 and 850 may be used. For example, the order of many of the blocks may be changed, certain blocks may be combined with other blocks, and many of the blocks described are optional. Further, the actions described in procedures 800 and 850 may be performed among multiple devices including, for example the installer 110, the user device 104, the server 202, and/or the installer 110 being executed by the processor 116 of the user device 104.

The example procedure 800 begins when the installer 110 receives a command to launch via, for example, a command line parameter provided by the wrapper 108 (block 802). The installer 110 determines if the encrypted unlock code 406 is included within the command line parameter (block 804). Conditioned on the encrypted unlock code 406 not being present, the example installer 110 transmits an error message 805 for display on the user device 104 and terminates the installation process (block 806). The error message 805 may include a prompt for the user to restart the installation.

However, conditioned on the encrypted unlock code 406 being present, the example installer 110 reads the serial number 502 from, for example, the hard drive 118 of the user device 104 (block 808). The example installer 110 converts the read serial number 502 into a hash number (e.g., a MD5 hash). The example installer 110 uses the hash number as a passphrase key to decrypt the encrypted unlock code 406 (block 810). The example installer 110 determines if there was an error during decryption (block 812). Conditioned on detecting an error or determining the encrypted unlock code 406 cannot be decrypted, the installer 110 transmits the error message 405 and terminates (block 806).

Conditioned on no error occurring during decryption, the example installer 110 verifies that the campaign identifier 402 and the date-time information 404 within the decrypted unlock code are of an appropriate specified format and within a specified range of acceptable values (e.g., look for the correct data in the correct, expected format) (block 814). If at least one of the campaign identifier 402 and the date-time information 404 is determined to be incorrect, the example installer 110 transmits the error message 405 and terminates (block 806). However, if the data is correct, the installer 110 independently determines the campaign identifier 602 either from the software product 106, a message from the wrapper 108, and/or other registration information 304 available during the installation (block 818). The installer 110 then compares the campaign identifier 602 to the campaign identifier 402 within the unlock code to determine if there is a match (block 820). Conditioned on detecting there is not a match, the installer 110 transmits the error message 405 and terminates (block 806).

However, conditioned on the campaign identifiers 402 and 602 matching, the installer 110 reads the current date-time information 604 from the user device 104 (block 822). The installer 110 also formats the date-time information 604 into a specified format. The example installer 110 then compares the current date-time information 604 to the decrypted date-time information 404 within the unlock code to determine, for example a time difference (block 824). Alternatively, the installer 110 may determine if the current date-time information 604 is within a specified time based on the date-time information of the unlock code or other registration information.

The installer 110 then determines if the time difference is within a threshold (block 826). Conditioned on the time difference exceeding the threshold, the installer 110 transmits the error message 405 and terminates (block 806). Alternatively, conditioned on the time difference being within the threshold, the installer 110 installs the software product 106 on the user device (block 828). The example procedure 800 then terminates. Alternatively the example procedure 800 may return to block 802 for installation of another software product.

The example procedure 850 begins when the user device 104 provides the serial number 502 of the hard drive 118 to the installer 110 during an installation process for the software product 106 (block 852). The user device 104 then determines whether an error message was received (block 854). Conditioned on receiving the error message 805, the user device 104 displays the contents of the error message 805 to a user via a display (block 856). The error message 805 may specify the exact cause of the error, such as, for example, an error occurring during decryption of the encrypted unlock code 406. However, if the error message 805 is not received the user device 104 provides the date-time information 604 to the installer 110 (block 858). The user device 104 then receives an installation of the software product 106 via the installer 110. The example procedure 850 may then terminate or return to installing another software product.

Registration Embodiment

Figure 10:
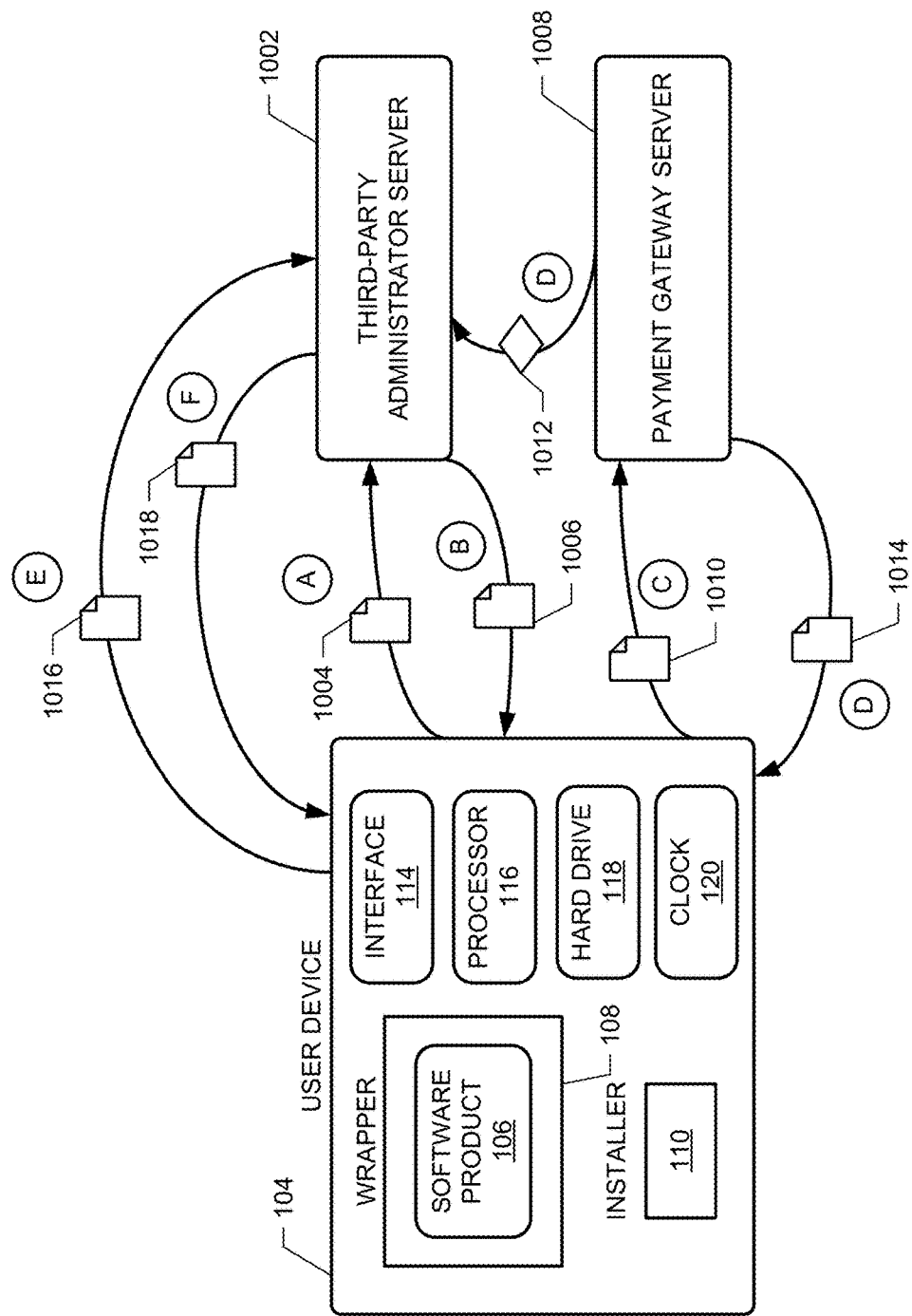
FIG. 10 shows a diagram of an example payment card industry compliant registration procedure for the software product, the wrapper, and/or the installer of FIGS. 1 to 9, according to an example embodiment of the present disclosure.

FIG. 10 shows a diagram of an example payment card industry compliant registration procedure for the software product 106, the wrapper 108, and/or the installer 110 of FIGS. 1 to 9, according to an example embodiment of the present disclosure. In this embodiment, the example user device 104 includes an un-configured wrapper 108 encompassing the software product 106. The wrapper 108 and the software product 106 (and the installer 110) may have been downloaded from, for example, the server 202 of FIG. 2 and/or a third-party administrator server 1002 (e.g., an ecommerce server). Alternatively, the wrapper 108 and the software product 106 may have been transferred to the user device 104 from the storage device 102 of FIG. 1.

At Event A, a purchase is requested via the user device 104 of the wrapper 108 to enable the software product 106 to be installed. For example, the user device 104 may launch the un-configured wrapper 108, which causes the wrapper 108 to display a webpage or other interface prompting the user to enter payment and/or registration information. The user enters the registration information, which is stored and transmitted as a payment signature message 1004 from the wrapper 108 (e.g., the user device 104) to the third third-party administrator server 1002. An example of the payment signature message 1004 is shown below. It should be noted that the payment signature message 1004 includes an identifier of the user device (i.e., 'camry'), a campaign identifier (i.e., 'CampaignID'), a product identifier, and credit card information (e.g., registration and payment information).

```
<PaymentSignatureRequest  client="camry"  version="2014"
CampaignID="141008"
PromoCode="WGPA" Attempt="1">
    <Products>
        <Product id="Win_P2" Price="24.95"/>
        <Product id="FD_EFile" Price="0.00"/>
        <Product id="ATA" Price="0.00"/>
    </Products>
    <Payment>
        <CreditCard    CCType="V"     Expires="4/2015"
        FirstName="John"
```

```
        LastName="Doe">
            <Address Street="1234 Any St." Unit="Apt 123"
            City="Somewhere" State="CT"
        ZipCode="60606" CellPhone="555-555-5555"/>
            <email OKtoContact="Yes">john@test.com</email>
            </CreditCard>
    </Payment>
</PaymentSignatureRequest>
```

In an alternative embodiment, the user may register and/or pay for the software product via a web site of the third-party administrator server 1002. In this alternative embodiment, the example wrapper 108 requests the payment signature message 1004 from the third-party administrator 1002.

Returning to FIG. 10, at Event B the third-party administrator server 1002 transmits a payment signature response message 1006. The response message 1006 may be sent after the third-party administrator server 1002 receives the payment signature message 1004, determines the registration and payment information is acceptable or within specified thresholds, and determines a universally unique identifier ("UUID") for the software product. An example payment signature response message 1006 transmitted from the third-party administrator server 1002 to the wrapper 108 is shown below. The payment signature response message 1006 includes a UUID and gateway parameters for processing the payment information. In particular, the gateway parameters include an endpoint web address of a payment gateway server 1008 (e.g., 'cybersource.com/silent/pay') and a web address of an ecommerce server for activation of the software product (e.g., 'hrblock.net/activation'). The payment signature response message 1006 also includes the registration and payment information included in the payment signature message 1004.

```
<PaymentSignatureResponse  TimeStamp="Fri  Aug  22  10:34:18 2014"  Success="Yes"
SOPID="7164" UUID="p94feCkdWp0rq7bgpa0">
    <GatewayParameters       Host="CyberSourceSA"       Method="POST"
ContentType="application/x-www-form-urlencoded"
Endpoint="https://testsecureacceptance.cybersource.com/silent/pay">
        <Content><![CDATA[ship_to_address_country=&locale=en&reference_number=
7164&ship_to_surname=&_signed_field_names=access_key%2Cprofile_id%2Ctransaction_uuid%
2Cpayment_method%2Csigned_date_time%2Csigned_field_names%2Cunsigned_field_names%
2Creference_number%2Clocale%2Ctransaction_type%2Camount%2Ccurrency&unsigned_field_names=
card_number%2Ccard_type%2Ccard_expiry_date%2Cbill_to_forename%2Cbill_t_surname%
2Cbill_to_email%2Cbill_to_address_line1%2Cbill_to_address_city%2Cbill_to_address_state%
2Cbill_to_address_postal_code%2Cbill_to_address_country%2Cship_to_address_line1%
2Cship_to_address_city%2Cship_to_address_state%2Cship_to_address_postal_code
&bill_to_address_state=CT&bill_to_email=john%40test.com&ship_to_address_postal_code=
&ship_to_forename=&bill_to_forename=John&profile_id=SATEST2&ship_to_address_city=
&card_type=001&payment_method=card&signature=ogLglqR0cQZfDBFeX7N1wvLfSXpmlLmxtuJXA1Cs%2BzA%
3D&bill_to_address_country=US&cid=141008&transaction_type=authorization
&ship_to_address_state=&_signed_date_time=2014-08-
22T15%3A34%3A18Z&promo=WGPA&currency=usd&ExpYear=2015&product_id=Win_P2
&ExpMonth=4&bill_to_address_postal_code=60606&card_expiry_date=4-
2015&bill_to_address_line1=1234+Any+St.&card_number=!*CARDNUMBER*!
&ship_to_address_line1=&amount=27.27&transaction_uuid=p94feCkdWp0rq7bgpa0&access_key=87e4
a8c3fc48303d86da245dae72478e&bill_to_address_city=Somewhere&ship_to_email=
&year=2014&bill_to_surname=Doe]]></Content>
        <CardNumberPlaceHolder>!*CARDNUMBER*!</CardNumberPlaceHolder>
    </GatewayParameters>
    <StartParameters   Host="EComServer"   Method="GET"   Endpoint="https://ecom-
        qa.hrblock.net/activation/startsop/2014?ref=7164" />
    <ActivationParameters>
        <Polling InitialDelay="4" RetryDelay="3" MaxRetries="10" />
    </ActivationParameters>
</PaymentSignatureResponse>
```

After receiving the payment signature response message 1006, the example wrapper 108 at Event C is configured to create a gateway post message 1010, which includes at least some of the gateway, payment, and registration information included within the payment signature response message 1006. The wrapper 108 transmits or posts the gateway post message 1010 to the payment gateway server 1008. The wrapper 108 then waits for an acknowledgement from the payment gateway server 1008 that the message 1010 was received. The wrapper 108 may be configured to wait for a maximum time of five minutes. If no acknowledgment is received within this time, the wrapper 108 ends the registration process and does not configure for installation of the software product 106. An example of the gateway post message 1010 is shown below.

```
<ActivationRequest    client="camry"    version="2014"
CampaignID="141008"
PromoCode="WGPA"
SUID="02210AA1FA176EA46FEA0AB81E7BD401"
PID="02210AA1FA176EA46FEA0AB81E7BD401"
DPID="ede03a860e24eb00214f9439be04f5e5" PricingUpdate="true"
offers="CreditReport">
    <Products>
        <Product id="Win_P2" Price="24.95"/>
        <Product id="FD_EFile" Price="0.00"/>
        <Product id="ATA" Price="0.00"/>
    </Products>
    <Payment>
        <PreAuthorization SOPID="7164"
        UUID="p94feCkdWp0rq7bgpa0"/>
    </Payment>
</ActivationRequest>
```

```
<GatewayParameters Host="CyberSourceSA" Method="POST" ContentType="application/x-
www-form-urlencoded" Endpoint="https://testsecureacceptance.cybersource.com/silent/pay">
    <Content><![CDATA[ship_to_address_country=&locale=en&reference_number=7164&
ship_to_surname=&signed_field_names=access_key%2Cprofile_id%2Ctransaction_uuid%
2Cpayment_method%2Csigned_date_time%2Csigned_field_names%2Cunsigned_field_names%
2Creference_number%2Clocale%2Ctransaction_type%2Camount%2Ccurrency&unsigned_field_names=
card_number%2Ccard_type%2Ccard_expiry_date%2Cbill_to_forename%2Cbill_to_surname%2Cbill_to_email%
2Cbill_to_address_line1%2Cbill_to_address_city%2Cbill_to_address_state
%2Cbill_to_address_postal_code%2Cbill_to_address_country%2Cship_to_address_line1%
2Cship_to_address_city%2Cship_to_address_state%2Cship_to_address_postal_code
&bill_to_address_state=CT&bill_to_email=john%40test.com&ship_to_address_postal_code=
&ship_to_forename=&bill_to_forename=John&profile_id=SATEST2&ship_to_address_city=
&card_type=001&payment_method=card&signature=ogLglqR0cQZfDBFeX7N1wvLfSXpmlLmxtuJXA1Cs%2BzA%
3D&bill_to_address_country=US&cid=141008&transaction_type=authorization&ship_to_address_state=
&signed_date_time=2014-08-22T15%3A34%3A18Z&promo=WGPA&currency=usd&ExpYear=2015&product_id=Win_P2
&ExpMonth=4&bill_to_address_postal_code=60606&card_expiry_date=4-
2015&bill_to_address_line1=1234+Any+St.&card_number=!*CARDNUMBER*!
&ship_to_address_line1=&amount=27.27&transaction_uuid=p94feCkdWp0rq7bgpa0&access_key=87e4
a8c3fc48303d86da245dae72478e&bill_to_address_city=Somewhere&ship_to_email=&year=2014
&bill_to_surname=Doe]]></Content>
    <CardNumberPlaceHolder>!*CARDNUMBER*!</CardNumberPlaceHolder>
</GatewayParameters>
```

In this embodiment, at Event D, the example payment gateway server 1008 processes the payment and registration information and sends a processing result message 1012 to the third-party administrator server 1002. The example payment gateway server 1008 also sends a status response message 1014 to the wrapper 108. An example of the status response message 1014 is shown below. In this embodiment, a status of 200 indicates that the payment was processed successfully.

```
[HTTPStatusEvent type="httpStatus" bubbles=false cancelable=false
eventPhase=2 status=200 responseURL=null]
```

Conditioned on receiving a status of 200 within the status response message 1014, the example wrapper 104 at Event E transmits an activation request 1016 to the third-party administrator server 1002. An example of the activation request 1016 is shown below. The activation request 1016 includes at least some registration information for identification purposes. The activation request 1016 also includes a SUID, a process identifier ("PID"), and a delivery point identifier ("DPID") determined by the wrapper 108. The activation request 1016 also includes the UUID as well as payment authorization information.

At Event F, the example third-party administrator server 1002 processes the activation request 1016. Processing may include determining that the activation request 1016 corresponds to or matches information within the processing result message 1012 from the payment gateway server 1008. The example third-party administrator server 1002 then transmits an activation response message 1018 to the wrapper 108. The activation response message 1018 may include an R0 code if the activation may proceed and an R7 code with error information if the activation may not proceed. The error information includes information indicative as to why the activation may not occur. If the R0 code is received, the example wrapper 108 completes its configuration and installs the software product 106 as discussed above in conjunction with FIGS. 1 to 4 and 7.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for creating a software wrapper for a software product, the apparatus comprising:
a wrapper configuration hardware processor and a machine-accessible device storing instructions thereon that are configured, when executed by the wrapper configuration hardware processor, to provision a software wrapper for a software product by:
generating a hash number of an identifier of a user device to receive the software product,
determining a campaign identifier of the software product from a secure variable within the software product,
generating a date-time code in a predefined format based on a current date and time,
creating an unlock code by assembling the date-time code and the campaign identifier into the unlock code, and
encrypting the unlock code using the hash number as a passphrase key to create an encrypted unlock code; and
a wrapper application hardware processor in communication with the wrapper configuration hardware processor, the machine-accessible device storing additional instructions thereon that are configured, when executed by the wrapper application hardware processor to:
apply the encrypted unlock code to an end of a filename of an installer of the software product using a command line parameter,
encompass the software wrapper around the software product to prevent the software product from being accessible without the software wrapper, and
transmit the installer and the software wrapper including the software product for installation on the user device,
wherein the campaign identifier includes a text string identifying at least one of a campaign, company, software type, software name, and software information associated with the software product.

2. The apparatus of claim 1, wherein the identifier of the user device includes a unique hard drive serial number from a primary hard drive of the user device.

3. The apparatus of claim 1, wherein the identifier is received from a third-party associated with the software product.

4. The apparatus of claim 3, wherein at least one of the wrapper configuration hardware processor and the wrapper application hardware processor is included within a server of the third-party associated with the software product.

5. The apparatus of claim 1, wherein the identifier is received from an online credit card payment gateway.

6. The apparatus of claim 1, wherein the campaign identifier is written to the secure variable after registration of the software product.

7. The apparatus of claim 1, wherein transmitting the installer and the software wrapper include storing the installer and the software wrapper on a storage device.

8. The apparatus of claim 7, wherein the storage device includes at least one of a compact disk ("CD"), a flash memory drive, and a near field communication ("NFC") memory card.

9. The apparatus of claim 1, wherein the wrapper configuration hardware processor generates the hash number using a MD5 message-digest algorithm and the hash number is a Set User ID upon execution ("SUID") number.

10. A method to lock a software product in a software wrapper comprising:
receiving, via a hardware processor, information indicative of a unique serial number that is related to a user device to which the software product is to be installed;
generating, via the hardware processor, a hash number based on the information indicative of the unique serial number;
determining, via the hardware processor, a campaign identifier of the software product from a secure variable within the software product;
generating, via the hardware processor, a date-time code in a predefined format based on a current date and time;
assembling, via the hardware processor, the date-time code and the campaign identifier into an unlock code;
encrypting, via the hardware processor, the unlock code using the hash number as a passphrase key to create an encrypted unlock code; and
applying, via the hardware processor, the encrypted unlock code to an end of a filename of an installer using a command line parameter,
wherein the campaign identifier includes a text string identifying at least one of a campaign, company, software type, software name, and software information associated with the software product.

11. The method of claim 10, wherein the hash number is generated using a MD5 message-digest algorithm and the hash number is a Set User ID upon execution ("SUID") number.

12. The method of claim 10, wherein the software product includes at least one of a computer-executable application, digital media, and a digital file.

13. The method of claim 10, wherein the unlock code is configured to be unlocked within a predetermined time that is between 5 seconds and 600 seconds.

14. The method of claim 10,
further comprising transmitting, via the hardware processor, the installer and the software wrapper to a storage device, wherein the storage device includes at least one of a compact disk ("CD"), a flash memory drive, and a near field communication ("NFC") memory card.

15. The method of claim 10, further comprising providing the software wrapper including the software product to a user device.

16. A non-transitory machine-accessible device having instructions stored thereon that are configured when executed to cause a hardware machine to at least:
receive information indicative of a unique serial number that is related to a user device to which a software product is to be installed;
generate a hash number based on the information indicative of the unique serial number;
determine, a campaign identifier of the software product from a secure variable within the software product;
generate a date-time code in a predefined format based on a current date and time;
compile the date-time code and the campaign identifier into an unlock code;

encrypt the unlock code using the hash number as a passphrase key to create an encrypted unlock code; and apply the encrypted unlock code to an end of a filename of an installer using a command line parameter, wherein the campaign identifier includes a text string identifying at least one of a campaign, company, software type, software name, and software information associated with the software product.

17. The machine-accessible device of claim 16, further comprising instructions stored thereon that are configured when executed to cause the hardware machine to at least transmit the software wrapper including the software product to a user device via a network.

18. The machine-accessible device of claim 16, further comprising instructions stored thereon that are configured when executed to cause the hardware machine to at least store the software wrapper including the software product to a storage device including one of a compact disk ("CD"), a flash memory drive, or a near field communication ("NFC") memory card.

19. The machine-accessible device of claim 16, further comprising instructions stored thereon that are configured when executed to cause the hardware machine to at least generate the hash number using a MD5 message-digest algorithm, wherein the hash number is a Set User ID upon execution ("SUID") number.

20. The machine-accessible device of claim 16, wherein the unlock code is configured to be unlocked within a predetermined time that is between 5 seconds and 600 seconds.

* * * * *